Sept. 5, 1939.   R. SARDESON   2,171,896
AUTOMATIC TOASTER
Filed Feb. 19, 1938   2 Sheets-Sheet 1
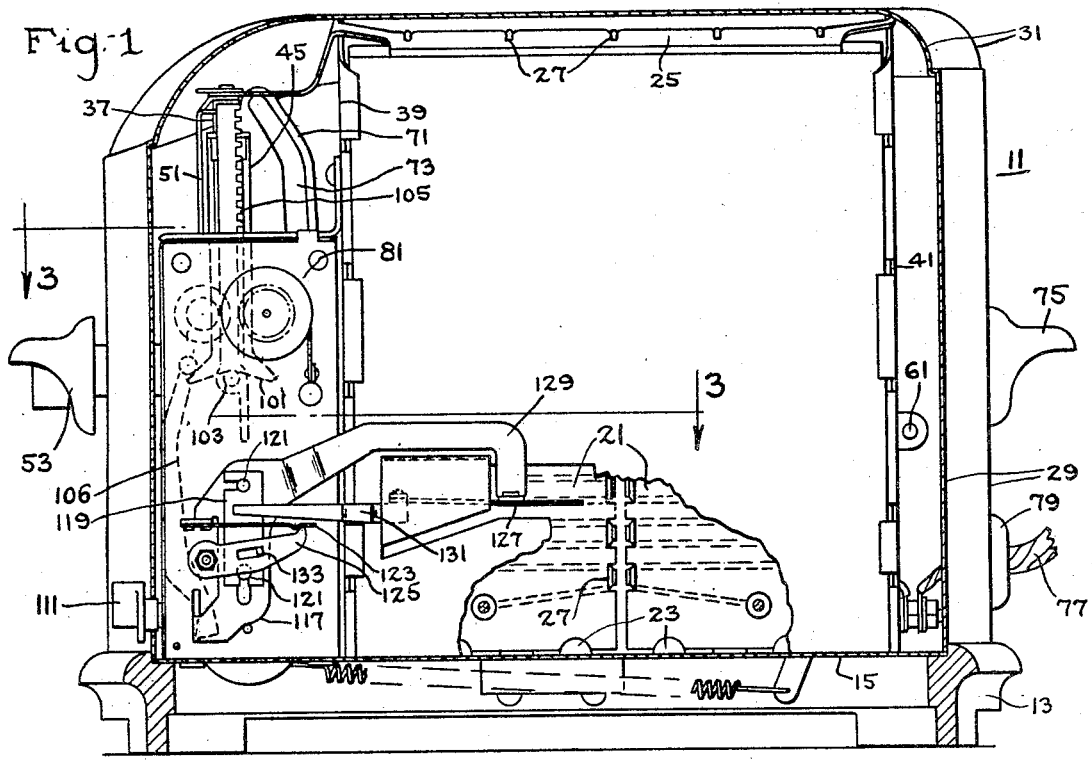
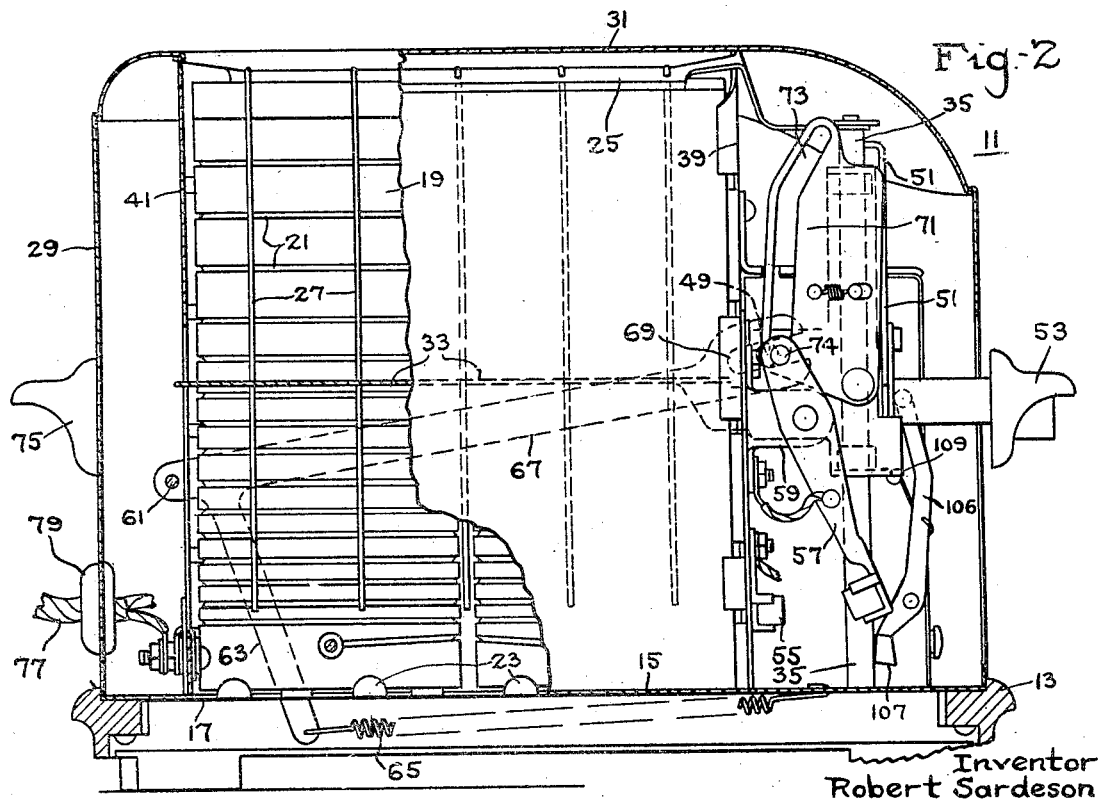
Inventor
Robert Sardeson.
By H M Biefeld
Attorney.

Sept. 5, 1939.  R. SARDESON  2,171,896
AUTOMATIC TOASTER
Filed Feb. 19, 1938  2 Sheets-Sheet 2
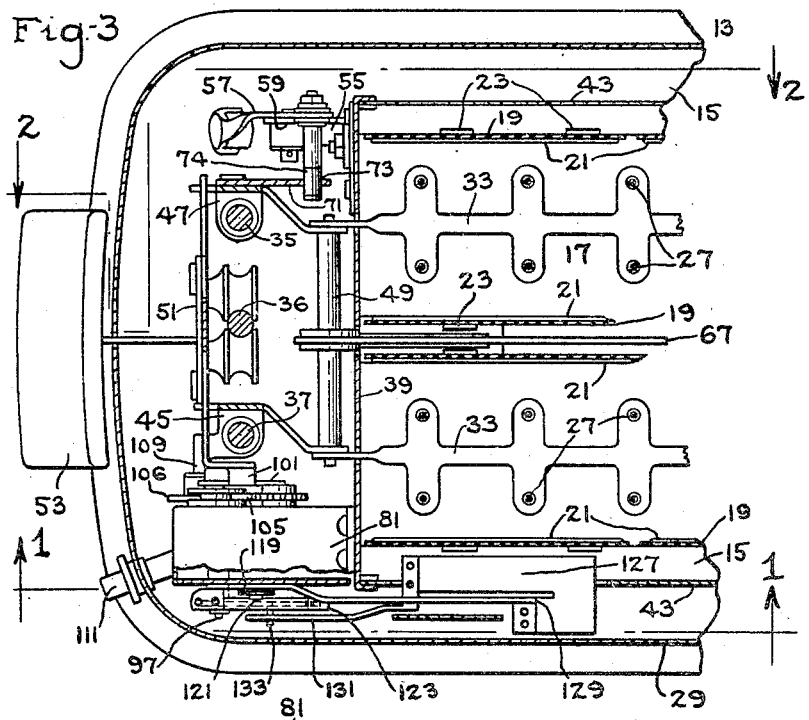
Inventor:
Robert Sardeson
By W. M. Biebel
Attorney Patented Sept. 5, 1939

2,171,896

UNITED STATES PATENT OFFICE 2,171,896

AUTOMATIC TOASTER

Robert Sardeson, Minneapolis, Minn., assignor to McGraw Electric Company, Chicago, Ill., a corporation of Delaware Application February 19, 1938, Serial No. 191,485

10 Claims. (Cl. 219—19)

My invention relates to cooking devices and particularly to automatic electric toasters.

The main object of my invention is to provide an automatic electric toaster having a thermally controlled timing mechanism to determine the duration of a toasting operation, said timing mechanism embodying a manual and a thermal control means acting on the timing mechanism to cause it to properly control the duration of a toasting operation irrespective of different energizing voltages applied to the toaster, to thereby obtain uniform toasting of successive slices of bread.

Another object of my invention is to provide a thermally controlled mechanical timer assembly for an automatic toaster that shall permit of making light toast when the heating elements are energized from a high voltage circuit and of making dark toast when the heating elements are energized from a low voltage circuit.

Other objects of my invention will either be apparent from the following description when taken in connection with the drawings accompanying the same or will be set forth in the specification and particularly in the appended claims.

In the drawings,

Fig. 1 is a view in vertical longitudinal section through a toaster embodying my invention, taken on the line 1—1 of Fig. 3, Fig. 2 is a view in vertical longitudinal section through a toaster embodying my invention taken on the line 2—2 of Fig. 3, Fig. 3 is a fragmentary view in horizontal section taken on the line 3—3 of Fig. 1, Fig. 4 is a fragmentary view in side elevation showing the manually and thermally controlled timing mechanism in one of its operatiive positions, Fig. 5 is a fragmentary view similar to Fig. 4 but showing the manually and thermally controlled timing mechanism in another of its operative positions, Fig. 6 is a fragmentary enlarged vertical sectional view taken on the line 6—6 of Fig. 5, Fig. 7 is a fragmentary enlarged view in vertical section taken on the line 7—7 of Fig. 8, and, Fig. 8 is an enlarged view in horizontal section taken on the line 8—8 of Fig. 5.

The general details of the vertical oven-type toaster designated generally by numeral 11 have been described in several earlier applications filed by the present inventor and therefore only such detailed description thereof will be given as is necessary to set forth the general details of the particular form of automatic electric toaster with which the device more particularly embodying my invention is shown. Reference may here be made to my copending application Serial No. 136,826 filed April 14, 1937, and assigned to the same assignee as is the present application for such details.

The toaster assembly 11 includes a skeleton base 13 which may be made of molded composition material having secured thereto at its upper edge a bottom plate 15 which may be made of thin sheet metal material and which may have a number of longitudinal openings therein corresponding in number to the number of bread slice supports embodied in the toaster. One of these openings is shown for instance at 17 in Fig. 2 of the drawings. It is to be noted further that while I have shown a two-slice toaster in the drawings, my invention is not limited thereto but is applicable to a toaster adapted to simultaneously operate on any number of slices of bread.

The toaster assembly includes further a plurality of vertically extending electric heating elements, here shown as four in number, each comprising one or more sheets of mica 19 on which are positioned wires or strips 21 of suitable resistor material. The bottom edges of the respective sheets of mica 19 may be held by bent-up lugs 23 constituting a part of the bottom plate 15. The upper ends of the respective sheets of mica 19 may be held by top frame plates 25 of which two are used in the structure shown in the drawings, guard wires 27 being suspended from the respective side portions of the top frame plates and having return bent portions at their upper ends to engage with the upper edges of the mica sheets all in a manner now well known in the art. The assembly includes further a casing 29 comprising front, rear and side walls and a cover member 31 all of which are now known in the art.

A pair of bread slice supports 33 are vertically movable in the toaster, each bread slice support being positioned between two spaced heating elements and movable from an upper non-toasting position to a lower toasting position in a manner well known in the art.

Means for movably supporting the bread slice supports may include a plurality of standards 35, 36 and 37 which are positioned in the front end portion of the toaster structure there being an intermediate wall 39 provided adjacent the front edges of the respective heating elements. A rear intermediate wall 41 is also provided as well as two baffle plates 43 spaced laterally from the outermost heating elements. The front intermediate wall 39 and rear intermediate wall 41 and the two outermost heating elements constitute the vertical walls of a cooking or toasting chamber the bottom plate 15 constituting a bottom closure therefor and the cover 31 constituting a top closure therefor.

A slider 45 is mounted on standard 37 and has a rearwardly extending portion rigidly connected to the front end portion of right-hand bread slice support 33. A slider 47 is movably mounted on standard 35 and is similarly connected to the front end portion of the left-hand bread slice support 33, the front end portion of these supports extending through front intermediate wall 39 in a manner well known in the art. A horizontal rod 49 may be provided to maintain the two bread slice supports in properly spaced position relatively to each other as well as to provide a rigid connection between the respective sliders and the bread slice supports. A carriage 51 is movably mounted on standard 36 and may move upwardly independently of the two sliders 45 and 47 but when moved downwardly by an operator pressing on a knob 53 outside of the casing, will cause downward movement of the two sliders and therefore of the bread slice supports.

Switching means for controlling the energization of the plurality of heating elements includes a fixed contact member 55 insulatedly supported on front intermediate wall 39 and a contact arm 57 also insulatedly mounted on the front intermediate wall as on a bracket 59. A bellcrank lever pivotally mounted at 61 on the rear intermediate wall 41 includes a depending short arm 63 to the lower end of which there is connected one end of a biasing spring 65 the other end of which is connected to the front part of bottom plate 15. A longer arm 67 of the bellcrank lever extends forwardly through a slot in the front intermediate wall 39 and has a slot 69 therein at its front end into which slot the central portion of rod 49 may fit so that when knob 53 is moved downwardly by an operator arm 67 will be turned in a clockwise direction, as seen in Fig. 2 of the drawings.

Slider 47 on standard 35 has a vertical plate 71 secured thereto which plate has an angularly extending slot 73 therein. The upper end of contact arm 57 has a laterally extending rod 74 secured thereto which pin moves in slot 73. The construction is such that upon downward movement of knob 53 carrying with it the bread slice supports 33 into their downward or toasting position slotted plate 71 is also moved downwardly and causes closing movement of contact arm 57 all in a manner well known in the art.

A rear carrying knob 75 may be provided and a twin conductor cable 77 may be brought out through an insulating bushing 79 in the rear wall of the outer casing to permit of connecting the toaster and particularly its heating elements to a source of supply of electric current.

The toaster assembly includes also a mechanical timer assembly 81 which is shown as of the type disclosed and claimed in Ireland Pat. No. 1,866,808. It is thought unnecessary to go into details as to this structure since it is now well known in this art and reference will be made only to Fig. 7 of the drawings where a gear wheel 83 is shown as driving a pinion 85 having fixedly mounted thereon a crank pin or eccentric 87 which is movable in the upper slotted end of an oscillator 89, the lower end of which engages the straight end of a coil spring 91, the other end of this spring being operatively connected with a balance wheel 93. The oscillator 89 is pivotally mounted on and adjustably supported by a lever arm 95, which lever arm is rigidly mounted on a shaft 97 which is supported by the timer assembly and more particularly by the side plates thereof. A biasing spring 99 is being provided to hold the oscillator in that position which will result in the slowest speed of operation of the timer thereby providing a relatively long duration of operation of the timer.

It may be here noted that the carriage 51 is provided with a lateral extension 101 (see Figs. 1 and 3), the lower edge portion of this extension being of inverted V-shape and adapted to engage a pin 103 extending laterally from a rack bar 105 to thereby cause winding up of the mechanical timer simultaneously with the movement of the bread slice supports into toasting position and closing of the circuit controlling switch for the heating elements.

If the knob 53 is released by an operator immediately after it has been moved to its lowermost position the timing mechanism will unwind causing an upward movement of the carriage and member 101, which member is so shaped at its upper edge (see Fig. 1) that it can engage with the upper end of a latch arm 106 and move the same so that its lower end portion 107 may be moved out of engagement with a part 109 on right-hand slider 45, the interengagement of members 107 and 109 holding the two sliders and the bread slice supports in their lowered position and the switch in closed position during a toasting operation.

Toasters of this general kind may be operated under a variety of conditions particularly as concerns the voltage of the electric circuit to which they are connected. While in most cases the operating voltage available is on the order of 115 volts, relatively higher voltages may be encountered at times, these voltages ranging up to 122 volts. It is also possible for a toaster of this kind to be connected to a circuit of extremely low voltage because of some abnormal condition as to load on a relatively long distribution circuit and as an extreme case of low voltage, cases have been found where this energizing voltage was on the order of 95 volts.

In addition to this, toasters of this general kind are designed and constructed so that it is possible to obtain "light" toast, that is toast that has been only slightly discolored, as well as "dark" toast, that is where the slice of bread has been toasted to a dark surface color. It is of course desirable to be able to obtain light toast when the toaster is energized from a high voltage circuit as well as to obtain dark toast on a low voltage circuit. To obtain light toast it is necessary that the duration of a toasting operation be relatively short while a much longer duration of a toasting operation is required if a dark piece of toast is desired. The elements now to be described in detail permit of obtaining any desired degree of toasting on either low, average or high voltage.

A manually actuable knob 111 is located at the lower front and side portion of the toaster casing and is mounted on the same shaft which carries a pinion 113, this shaft being supported in a bearing member 115. The pinion 113 meshes with the inner toothed end portion of a bracket 117 which bracket is of generally L-shape and may move vertically against the outer side plate of the timing mechanism. The bracket 117 is held against the outer surface of the side plate by a bowed spring 119 interfitting with pins 121 in a manner now well known in the art.

A resilient stop 123 is mounted on and supported by the bracket 117 and extends in a substantially horizontal position adjacent the outer surface of the right-hand side plate of the timer, as seen from the front of the toaster. An arm 125 is fixedly mounted on shaft 97 and has an outer end portion projecting from the substantially straight intermediate portion to engage the lower surface of the resilient stop member 123 substantially as shown in Figs. 1, 4 and 5.

The thermal control member includes a bimetal bar 127 which comprises a longer main portion and a shorter compensating portion, the outer or free end of the shorter leg being secured to an end portion 129 of the bracket 117. The particular details of a bimetal thermostat of this kind are disclosed and claimed in my copending application Serial No. 130,287 filed March 11, 1937 and assigned to the same assignee as is the present application. A cam member 131 of generally bar shape has one of its ends secured to the free end of the longer leg of the thermostat, this cam arm extending forwardly of the bimetal thermostat and being adapted to engage with a laterally extending lug 133 bent out of the general plane of arm 125. It will be noted that the point of engagement of arm 125 and member 123 is substantially at the outer end of arm 125 while the point of engagement of cam arm 131 with the single arm speed adjusting lever 125 is at a point intermediate its ends, at lug 133. Spring 99 tends, as has already been set forth hereinbefore, to bias the oscillator to its slow speed position and the outer end of arm 125 will therefore be continuously in engagement with the lower surface of the resilient arm 123. Turning movement of knob 111 in one direction will cause downward movement of bracket 117 and of member 123 thereby causing turning movement of arm 125 in a clockwise direction (as seen in Figs. 1, 4 and 5) whereby the speed of operation of the timing mechanism may be increased by manually actuable means.

When the toaster is operated and the heating elements are energized the forward end of the longer leg of bimetal thermostat 127 moves downwardly, thereby moving cam bar 131 downwardly or in a counterclockwise direction as seen in Figs. 1, 4 and 5. There is, therefore, a lost motion connection between the cam bar and the speed adjusting lever, the amount of this lost motion varying with the manually-effected setting of the bracket 117.

Fig. 5 of the drawings illustrates the position of bracket 117 and of arm 125 when dark toast is desired and when operating on a low voltage. It will be noted that bracket 117 is in substantially its uppermost position and the distance between lug 133 and the bottom edge of cam bar 131 (which is shown in the position which it occupies when cold) is relatively large.

Fig. 4 shows the parts when the knob 111 has been so turned that the bracket 117 has been moved slightly downwardly so that average toast as to color will be obtained. Referring to Fig. 1 of the drawings, the parts are shown in the positions which they will occupy when a light piece of toast is desired on a high voltage energizing circuit, the bracket 117 being in its lowermost manually adjustable position. It will be noted particularly that the distance between the bottom of the cam bar 131 and lug 133 is much less than the distance between these two parts when in the positions shown in Fig. 5 of the drawings.

The design and construction of the thermally actuable controlling means including the bimetal thermostat and the cam bar is such that the thermostat is deflected enough during the first cycle of operation, starting with a cold toaster, to act upon the speed control lever 125 and thereby cause speeding up of the timing mechanism and a shortening of the duration of the operating period. When it is desired to obtain a dark piece of toast on low voltage, it is necessary that the duration of the operating period be relatively long and this may require a duration on the order of three and one-half minutes or possibly even slightly longer. It is therefore desirable that the cam surface does not engage with the speed control lever 125 until at a relatively late instant of time in the operating period and this result is obtained by making the distance between the cam bar 131 and the lug 133 relatively great by operation of the manually actuable adjusting means to move the parts to the positions shown in Fig. 5 of the drawings.

If an operator should desire to obtain a relatively light piece of toast on a high voltage energizing circuit it is necessary that the parts be first adjusted manually to the positions shown in Fig. 1 of the drawings to start the timing mechanism at a relatively high speed and to then cause the thermally actuable cam bar 131 to engage the speed adjusting lever relatively earlier in the course of an operating period so that the duration of an operating period may be on the order of forty-five seconds when the toaster assembly has attained its maximum operating temperature. It will be noted that the temperature variation necessary to cause the cam bar to actually engage the speed adjusting lever is much less than was the case when the parts were in the position shown in Fig. 5 of the drawings.

Tests on a toaster structure of this kind have shown that the lug 133 may be so located between the ends of the speed adjusting lever 125 that it is possible to obtain substantially uniform degree of toasting with a given manual setting of the parts, when the toaster is energized at voltages varying from 95 volts to 120 or even 122 volts. This result is possible even though the length of time elapsing between successive operating periods varies from a very few seconds to lengths of time on the order of a minute, five minutes or more. The function of the hump near the end of resilient member 123 is to ensure that the change in the lost motion relationship between the cam bar 131 and the speed changing lever arm 125 would be other than a straight line, whereby a more uniform toasting effect with varying supply circuit voltage is obtained.

The device embodying my invention has been found to operate in the desired manner to attain the objects set forth hereinbefore and it may be noted that the elements used are relatively simple and inexpensive for the desired purpose.

It is evident that a given degree or amount of movement of the thermally actuable control means causes a greater variation in timer speed than would be caused by a similar degree or amount of movement of the manually actuable means.

While I have illustrated and described a particular kind of encased or oven-type toaster, I desire it to be understood that my invention is not limited to such particular details of construction but that it may be applied to other forms of toasters. It is to be understood also that changes may be made in the particular details of construction of the thermally and manually controllable timing mechanism as will be covered by the appended claims which are to be limited only by the prior art.

I claim as my invention:

1. An automatic electric toaster comprising a heating element, means to initiate a toasting operation and means to terminate a toasting operation, said terminating means including a variable speed mechanical timer having a single arm lever pivotally mounted thereon and connected to change the timer speed when turned, a manually-movable means having resilient engagement with said lever and a thermally-actuable means mounted on and movable with said manually-movable means and spaced from said lever arm at normal temperature, the space between the thermally-actuable means and the lever arm at constant temperature decreasing with manually-effected movement of the lever in a timer-speed-increasing direction.

2. In an automatic toaster, the combination with a heating element for toasting a slice of bread and a variable speed mechanical timer means for terminating the toasting of a slice of bread, of a lever arm connected with said mechanical timer to cause a change of speed thereof when the lever arm is turned, means to bias said lever arm in a timer-speed-reducing direction, a manually-movable means acting on said lever arm to cause turning movement thereof, a spring bar carried by the manually-movable means and engaging said lever arm to provide a resilient cushioning and noise-reducing connection between the manually-movable means and the lever arm, the extent of turning movement of said lever arm being substantially the same as the extent of movement of said manually-movable means, and a thermostat effective when heated to act on said lever arm to cause turning movement thereof, the extent of such turning movement being greater for a given extent of movement of the thermostat than would result from the same extent of movement of the manually-movable means.

3. An automatic electric toaster comprising a heating element subjectable to different voltages, means to initiate a toasting operation and means to terminate a toasting operation, said terminating means including a variable speed mechanical timer having a pivotally mounted lever arm thereon and connected therewith to cause a change in speed of the timer when turned, means to bias the lever arm in a timer-speed-reducing direction, a manually-movable means for acting on said lever arm to increase the initial speed of the timer when the toaster is to operate at a relatively high voltage, a spring bar carried by said manually-movable means engaging said lever arm to provide a cushioning and noise-reducing connection therebetween, and a thermally-actuable means effective when heated to act on said lever arm to cause an increase in timer speed, said movable and said thermally-actuable means acting on said lever arm so that a given increase of temperature of the thermally-actuable means above room temperature causes a greater increase in timer speed when said timer is manually adjusted for toaster operation at higher voltage than when manually adjusted for operation at lower voltage.

4. In an automatic toaster, the combination with a heating element for toasting a slice of bread and a variable speed mechanical timer means for terminating the toasting of a slice of bread, of a lever arm fixedly pivotally mounted at one of its ends on said mechanical timer and connected with said timer to cause a change of speed thereof when the lever arm is turned, a manually-actuable means engaging said lever arm at one point thereof for causing turning movement thereof and a thermally-actuable means supported solely by said timer and mounted on said manually-movable means and effective when heated to engage said lever arm at another point thereon for causing turning movement thereof.

5. In an automatic toaster, the combination with a heating element for toasting a slice of bread and a variable speed mechanical timer means for terminating the toasting of a slice of bread, of a lever arm fixedly pivotally mounted at one of its ends and connected with said mechanical timer to cause a change of speed thereof when the lever arm is turned, a manually-actuable member supported solely by said timer and a plurality of separate means mounted on and supported solely by said manually-actuable member for causing turning movement of said speed changing lever arm and engaging said lever arm in such manner, that substantially similar degrees of movement of the respective means cause different degrees of turning movement of said lever arm.

6. In an automatic toaster, the combination with a heating element for toasting a slice of bread and a variable speed mechanical timer means for terminating the toasting of a slice of bread, of a lever arm fixedly pivotally mounted at one of its ends on said timer and connected therewith to cause a change of speed thereof when the lever arm is turned, a manually-movable means acting on said lever arm to cause turning movement thereof, the extent of such turning movement being substantially the same as the extent of movement of said manually-movable means and a thermostat mounted and supported solely on said manually-movable means and normally free of any mechanical stress, said thermostat being effective when heated to act on said lever arm to cause turning movement thereof, the extent of such turning movement being greater for a given extent of movement of said thermostat than would result from the same extent of movement of the manually-movable means.

7. In an automatic toaster, the combination with a heating element for toasting a slice of bread and a variable speed mechanical timer means for terminating the toasting of a slice of bread, of a lever arm fixedly pivotally mounted at one of its ends on said timer and connected therewith to cause a change of speed thereof when said lever is turned, a manually-actuable means on said timer acting on said lever arm to cause turning movement thereof, a thermally-controlled means supported solely by said timer and mounted on and movable with said manually-actuable means, out of any operative engagement with and spaced a given distance from said lever arm at room temperature and effective when heated beyond a predetermined temperature to engage and turn said lever arm to cause an increase of speed of the timer, said manually-actuable means being effective when moved in timer-speed-increasing direction at a constant temperature to reduce the distance between the thermally-controlled means and its point of engagement with said lever arm.

8. An automatic electric toaster comprising a heating element subjectable to different supply circuit voltages, means to initiate a toasting operation and means including a variable speed mechanical timer having a lever arm fixedly pivotally mounted thereon at one of its ends, and connected with the timer to cause a change in speed of the timer when turned, a manually-actuable means for acting on said lever arm to increase the initial speed of the timer when the toaster is to operate at a relatively high voltage and a thermally-actuable means supported solely by said timer, carried by said manually-actuable means, and normally out of any operative engagement with said lever arm and effective when heated to act on said lever arm to cause an increase in timer speed, said manually-actuable and said thermally-actuable means acting on said lever arm so that a given increase of temperature of the thermally-actuable means above room temperature causes a greater increase in timer speed when said timer is manually adjusted for toaster operation at higher voltage than when manually adjusted for operation at lower voltage.

9. A device as set forth in claim 6 and including a spring bar carried by the manually-movable means and engaging said lever arm, said spring bar providing a resilient cushioning and noise-reducing connection between the manually-movable means and the lever arm.

10. An automatic electric toaster comprising a heating element subjectable to different voltages, means to initiate a toasting operation and means to terminate a toasting operation, said terminating means including a variable speed mechanical timer having a lever arm fixedly pivotally mounted at one of its ends thereon and connected therewith to cause a change in timer speed when turned, means to bias said lever arm in a speed-reducing direction, a manually-actuable means on said timer having a spring bar thereon engaging said lever arm at a point a given distance away from said pivotally mounted end, and a thermally-actuable means supported solely by said timer, supported solely by and movable with said manually-actuatable means and normally out of engagement with said lever arm and effective when heated to operatively engage said lever arm at a point intermediate its ends.

ROBERT SARDESON.